(12) United States Patent
Nadherny et al.

(10) Patent No.: US 7,513,727 B2
(45) Date of Patent: Apr. 7, 2009

(54) LADING TIE ANCHOR LINK ADAPTER

(75) Inventors: Rudolph E. Nadherny, Golden, MO (US); Barry T. Glass, Crest Hill, IL (US)

(73) Assignee: Ireco, LLC, Bensenville, IL (US)

( * ) Notice: Subject to any disclaimer, the term of this patent is extended or adjusted under 35 U.S.C. 154(b) by 385 days.

(21) Appl. No.: 11/116,840

(22) Filed: Apr. 28, 2005

(65) Prior Publication Data

US 2005/0254917 A1 Nov. 17, 2005

Related U.S. Application Data

(63) Continuation-in-part of application No. 29/204,976, filed on May 6, 2004, now Pat. No. Des. 523,326.

(51) Int. Cl.
*B65D 63/00* (2006.01)
*B61D 45/00* (2006.01)

(52) U.S. Cl. .................. 410/106; 410/107; 410/110

(58) Field of Classification Search .............. 105/355, 105/375, 404, 411, 422; 410/101, 104, 105, 410/102, 106, 107, 110, 111, 116
See application file for complete search history.

(56) References Cited

U.S. PATENT DOCUMENTS

| 2,226,667 | A |  | 12/1940 | Love |  |
|---|---|---|---|---|---|
| 2,587,882 | A |  | 3/1952 | Oakley |  |
| 2,596,855 | A |  | 5/1952 | Johnson |  |
| 2,803,201 | A |  | 8/1957 | Johnson et al. |  |
| 2,843,060 | A |  | 7/1958 | Sladek |  |
| 2,897,771 | A |  | 8/1959 | Johnson |  |
| 2,930,330 | A |  | 3/1960 | Jensen et al. |  |
| 3,125,036 | A |  | 3/1964 | Reynolds |  |
| 3,233,319 | A |  | 2/1966 | Jensen et al. |  |
| 3,831,532 | A | * | 8/1974 | Smith et al. | 410/107 |
| 4,060,036 | A |  | 11/1977 | Palms |  |
| 4,297,962 | A | * | 11/1981 | Johnson, Jr. | 114/218 |
| 4,373,841 | A |  | 2/1983 | Adler et al. |  |
| D281,860 | S |  | 12/1985 | Nadherny |  |
| 5,052,869 | A |  | 10/1991 | Hansen, II |  |
| 5,180,263 | A |  | 1/1993 | Flowers, Jr. |  |
| 5,330,300 | A |  | 7/1994 | Jones et al. |  |
| 6,592,310 | B2 | * | 7/2003 | Hyp et al. | 410/104 |
| 6,655,886 | B2 |  | 12/2003 | Grandy |  |

OTHER PUBLICATIONS

Ireco Inc. "Flexi" Lading Tie Anchor, 1962.
Portec Lading Tie Anchor, circa. 2001.

* cited by examiner

*Primary Examiner*—S. Joseph Morano
*Assistant Examiner*—Robert J McCarry, Jr.
(74) *Attorney, Agent, or Firm*—Cook Alex Ltd.

(57) ABSTRACT

An anchor assembly has a retainer and an interlocking link, with the link secured to the floor of a flatcar by the retainer. An adapter welded to the load bearing surface provides an enhanced banding radius which reduces the risk of band breakage, without requiring replacement of the existing anchor assembly. The adapter includes a saddle portion and preferably tabs to prevent misalignment during installation of the adapter onto the link. A metal band is connected at one end to a load bearing surface of the combined link and adapter of a first anchor assembly and at another end to a load bearing surface of the combined link and adapter of a second anchor assembly. A tensile force is applied to the steel banding and crimped with a clip to secure cargo.

24 Claims, 4 Drawing Sheets

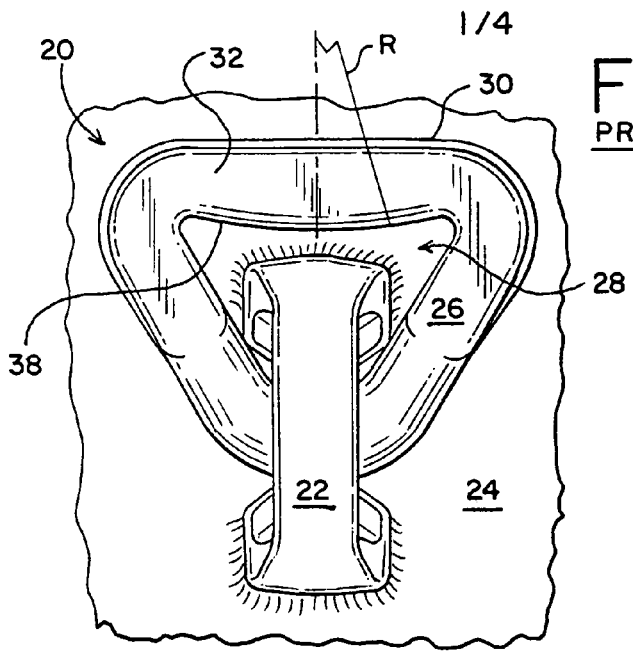
FIG. 1
PRIOR ART
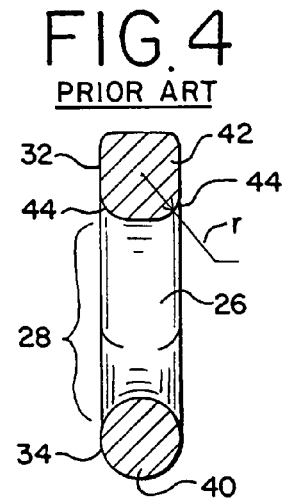
FIG. 4
PRIOR ART
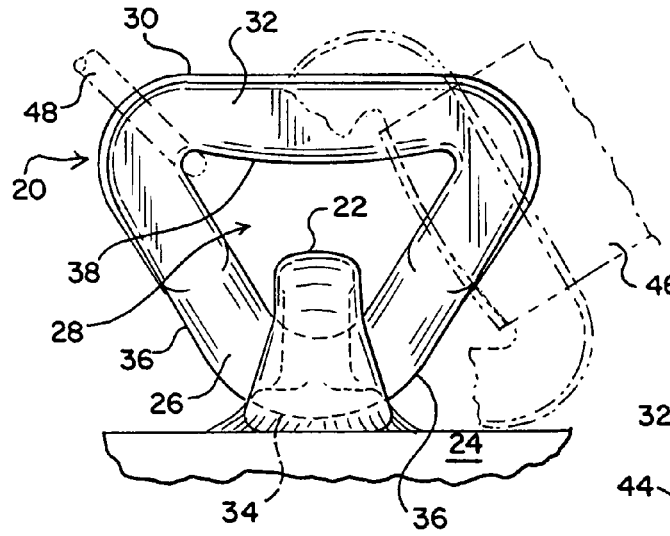
FIG. 2
PRIOR ART
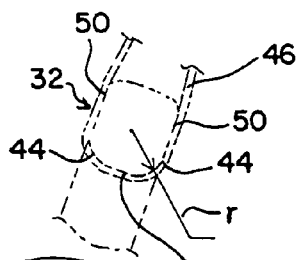
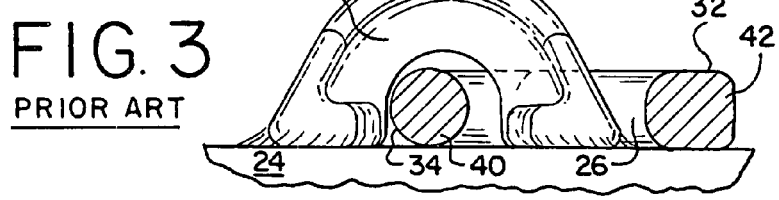
FIG. 3
PRIOR ART

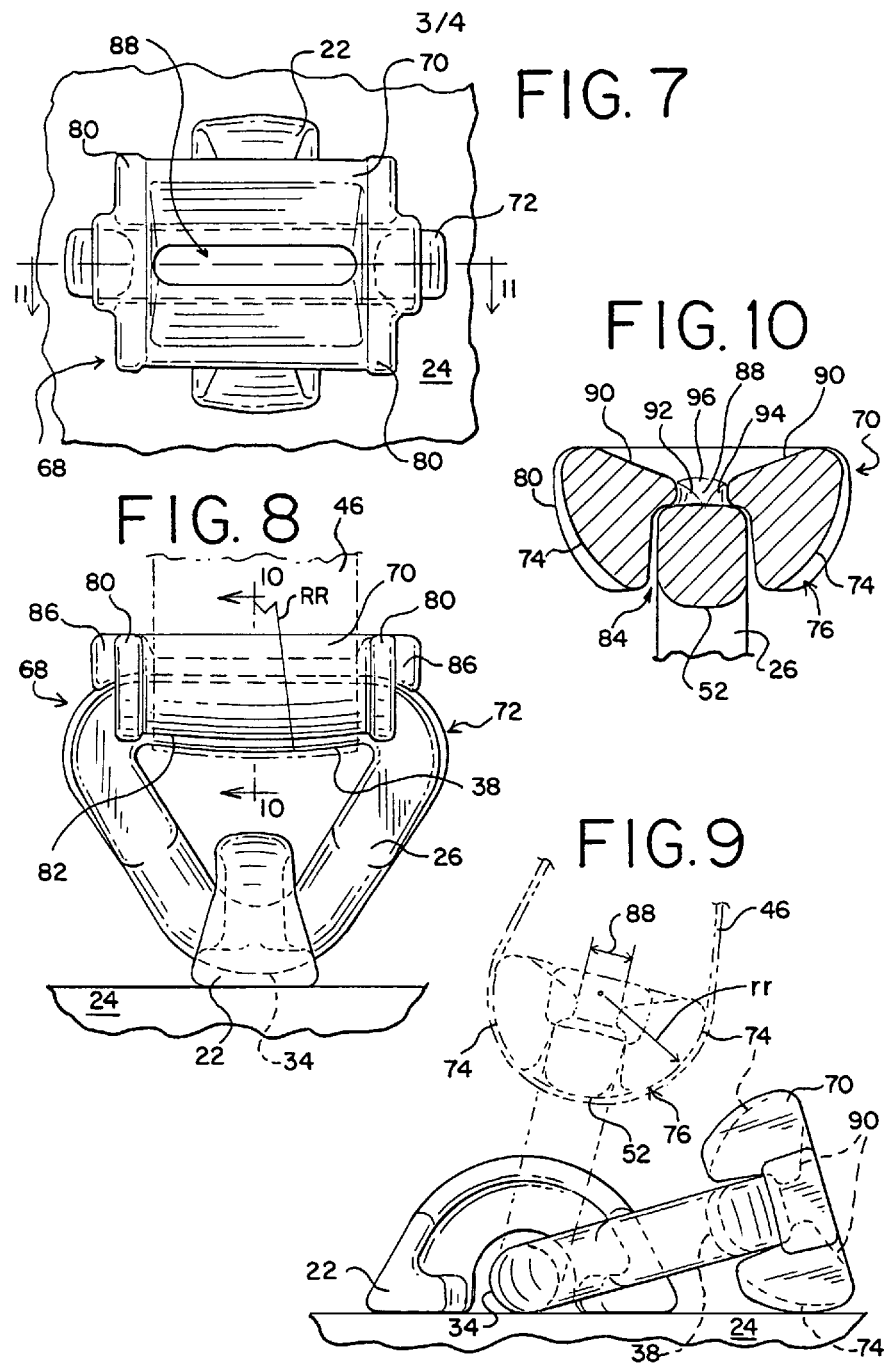

LADING TIE ANCHOR LINK ADAPTER

CROSS REFERENCE TO RELATED APPLICATION

This is a continuation-in-part application of application Ser. No. 29/204,976, filed May 6, 2004 now U.S. Pat. No. D,523,326.

BACKGROUND OF THE INVENTION

1. Field of the Invention

This invention generally relates to an anchor for securing cargo, using metal banding, onto railway cars including flatcars, center beams, gondolas and log cars. A retrofit adapter for the link of a two-piece anchor assembly is used to decrease the occurrence of banding breakage. The enhanced link radius provided by the adapter results in a greater contact area for engaging the banding, thereby reducing the stress present in the banding when securing heavier and/or top-heavy loads, such as steel pipe. Special application is found for this approach in securing heavy loads transported by flatcar.

2. Description of Related Art

Heavy loads, such as steel pipe and the like, can be transported in a number of ways, including by flatcar. In order to prevent the cargo from becoming damaged, it is necessary to provide securing means. Various known securing means include plastic strapping, cord strapping, and steel banding. The preferred way to secure a heavy load is to bind it with a plurality of steel bands or straps. In practice, each band is connected to the floor or side frame of the flatcar by an anchor assembly at opposite sides of the cargo. Once the band is connected to the anchors and tightened, a crimp seal typically is applied to maintain an appropriate tension level during transport.

Many types of anchor assemblies are well-known. The "Flexi" anchor assembly made by Ireco LLC is an example of a known device. FIGS. 1-4 illustrate a device 20 according to the two-piece "Flexi" anchor assembly. The "Flexi" assembly 20 comprises a steel retainer 22 which is affixed to the floor or frame 24 of a flatcar and a steel link 26 which is movably connected to the retainer 22. The arcuate retainer 22 takes the form of an inverted "U" which can be welded to the floor or frame 24 of the flatcar. The link 26 is triangular and defines a generally triangular central aperture 28 which interlocks the retainer 22. The anchor assembly 20 is configured such that the retainer 22 passes through the central aperture 28 of the link 26 and effectively hooks the link 26 to a floor surface or a frame area 24 of the flatcar.

One side 30 of the link 26 includes a banding portion 32, while the end 34 defined by the other two sides 36 engages the retainer 22. FIGS. 1 and 2 show that the banding portion 32 includes a lateral convex curvature surface 38 facing the central aperture 28. This part of the banding portion 32 has a radius of curvature "R" of approximately five inches. FIG. 4 shows that the cross section 40 of the retainer-engaging end 34 is circular, while the cross section 42 of the banding portion 32 approximates a rectangle with curved corners. The two corners 44 nearest the central aperture 28 have a 0.25 inch radius of curvature "r".

In use, a securing means, such as a steel band 46, is passed through the aperture 28 of the link 26, so as to engage the banding portion 32. Banding surface 38 is sufficiently wide to accept a 1.25 inch or 2 inch steel band. When tension is applied to the steel band 46, it tightens against the banding portion 32 and deforms in part to take the shape of the lateral convex curvature surface 38. FIG. 2 shows in broken lines that the link 26 is free to take an angled orientation when the steel band 46 engages the banding surface 38. FIG. 2 also shows in broken lines the use of a cable or wire 48 extending from an end of the link between two sides 30 and 36.

The steel band 46 engages a portion of the cross-sectional perimeter of the banding portion 32 of the link 26, best shown in broken lines in FIG. 3. The surface of the banding portion 32 along the link 26 generally conforms to the opposing, parallel surfaces 50 of the link 26 and the lower surface 52. The magnitude of the curvature of the steel band 46 about the banding portion 32 is referred to herein as the banding radius "r". It can be seen that the banding radius "r" in FIG. 3 varies due to the irregular shape of the banding portion 32. The lower curved corners 44 each subject the steel band 46 to a relatively sharp curve, which can result in creasing of the steel band 46. FIG. 3 also shows the link 26 flat against the floor surface 24 of the flatcar, in a stored position when it is not in use.

It will be appreciated that a large tensile force must be applied to the steel bands in order to secure the cargo. One problem associated with prior art anchor assemblies which we now have determined to be important is that, when the steel bands are subjected to such large tensile forces, especially when combined with forces that result from even slight shifting of lading weight during the rocking movement of rail transport, there is the possibility that metal fatigue will cause the bands to fail.

The movement of rail transport can cause repetitive back and forth bending at locations where the banding engages a corner or tight radius. We have determined that the banding radius of anchor assemblies as illustrated in FIGS. 1-4 is inadequate, especially when used to secure top-heavy or uneven loads, such as a load of steel pipes, the steel band can become creased along the curved corners of the banding portion, which creases are subjected to dynamic bending forces over time and subsequently break. This is especially problematic when the cargo must be transported a great distance. The steel band can withstand only a certain stress level and will deform and fail once that level is exceeded. It is thought that the critical stress level decreases due to the combination of creasing, dynamic bending forces, and metal fatigue associated with prior art anchor assemblies. As large tensile forces are required to safely secure heavier loads, and as heavy unbalanced loads need to be transported by rail over long distances, an anchor assembly which reduces the risk of band breakage is needed.

FIGS. 5 and 6 illustrate examples of previous attempts to solve these band breakage problems. As shown, both anchors 56 and 58 provide a right cylindrical element 60 having a larger banding portion than that illustrated in FIGS. 1-4, while also providing an increased banding radius. The cylindrical element 60 is separate from the link body 62 and mounted thereto by a bolt 64, which is itself secured to the link body 62 by a threaded nut 66.

It will be appreciated that, in lading anchors for steel bands, the stress in the steel band is inversely proportional to the area of the band which engages the banding portion of the link. Hence, for a given tensile force applied to the steel band, a larger area of engagement between the band and the banding portion of the anchor will allow for a greater force distribution, which decreases the stress to which the steel band is subjected. An increased banding radius (perpendicular to the axis of a right cylinder such as element 60 of FIGS. 5 and 6) is also desirable because it reduces the risk of creasing the steel band which, when combined with dynamic bending forces, leads to metal fatigue and eventually failure at heavier loads. Accordingly, the anchor assemblies of FIGS. 5 and 6 attempt to decrease band breakage by providing a larger banding portion and right cylindrical banding radius. The anchor assemblies of FIGS. 5 and 6 are relatively expensive because they require several components (i.e. a cylinder, a bolt, and a nut) to achieve their goal.

Accordingly, a general object and aspect of the present invention is to provide an improved anchor assembly for use with a railway car such as a flatcar, a center beam car, a gondola car, a long car and the like.

Another object or aspect of this invention is to reduce lading band breakage without requiring the replacement of existing anchor assemblies.

Another object or aspect of the present invention is to provide an improved retrofit anchoring assembly and method that address metal banding breakage problems for top-heavy lading loads, including those encountered during long-distance rail transport.

Another object or aspect of this invention is to provide an improved structure and method for securely and accurately retrofitting existing lading tie anchor links so as to significantly enhance their performance.

Other aspects, objects and advantages of the present invention, including the various features used in various combinations, will be understood from the following description according to preferred embodiments of the present invention, taken in conjunction with the drawings in which certain specific features are shown.

SUMMARY OF THE INVENTION

In accordance with the present invention, a retrofit adapter for a popular existing anchor assembly for railway cars reduces the risk of band breakage at large tensile forces by providing a link with a combined load bearing surface having an enhanced banding surface configuration. The adapter is configured for attachment to the banding surface of a link of the type shown in FIGS. 1-4, preferably by including a saddle section having an inset which accommodates the existing anchor assembly. A slot in the body of the adapter provides access to advantageous adapter-link welding locations. Once engaged, the adapter gives the link a banding surface which decreases "creasing" of metal banding secured thereby and results in a larger effective load bearing surface that decreases stress transmitted to the metal banding. Additionally, this benefit is possible without requiring the user to discard existing anchor assemblies already affixed to the floor or frame of a flatcar.

The adapter preferably includes positioning members which engage surfaces of an existing link prior to securement of the adapter to the link. This gives an easy orientation of the adapter with respect to the link and eases the initial application and assures accurate placement of the metal banding to the anchor assembly.

BRIEF DESCRIPTION OF THE DRAWINGS

FIG. 1 is a top plan view of a prior art anchor assembly in a stored position;

FIG. 2 is a front elevational view of the anchor assembly of FIG. 1, with broken lines to illustrate the link-retainer connection and to show the application of a wire or a steel band;

FIG. 3 is a right side cross-sectional view of the link of FIG. 1, with the retainer in elevation, showing the link in a stored position and a broken line illustration of a steel band applied to the link;

FIG. 4 is a cross-sectional view of the link of the anchor assembly shown in FIG. 1;

FIG. 7 is a top plan view of an anchor assembly having a retrofit adapter according to the present invention, with broken lines to illustrate the adapter-link connection;

FIG. 8 is a front elevational view of the anchor assembly of FIG. 7, with broken lines to illustrate the adapter-link and link-retainer connections;

FIG. 9 is a right side view of the anchor assembly of FIG. 7, with the retainer in elevation, showing the link in a stored position and a separate broken line illustration of the link and adapter in use;

FIG. 10 is cross-sectional view of the link and adapter of FIG. 7, along the line 10-10 of FIG. 8, with a preferred welding procedure;

DESCRIPTION OF THE PREFERRED EMBODIMENTS

Figure 5:
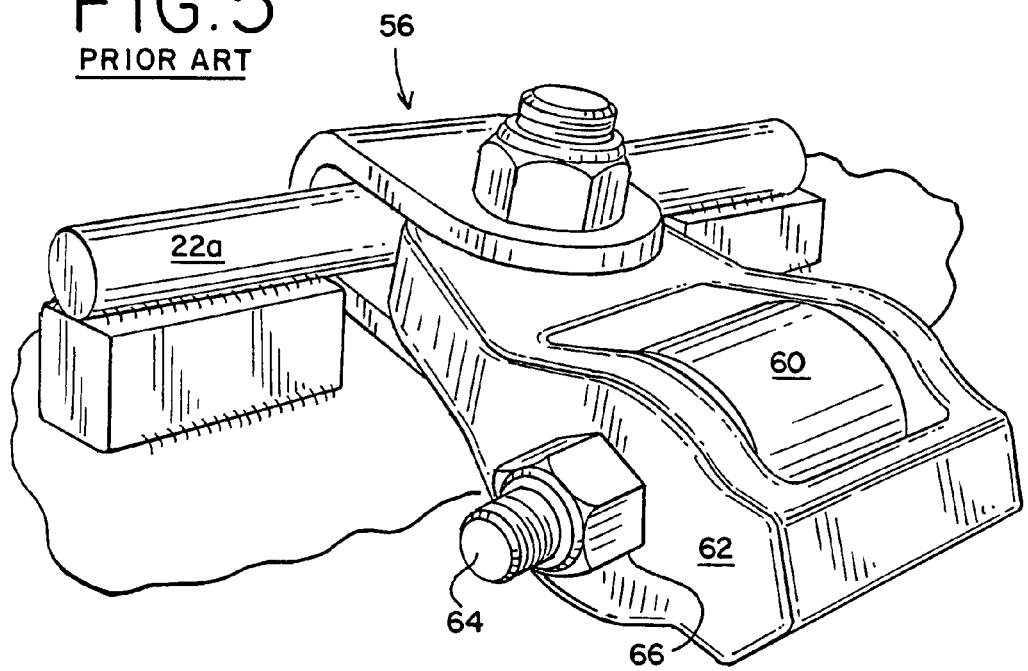
FIG. 5 is a perspective view of another prior art anchor assembly having an increased banding radius.
Figure 6:
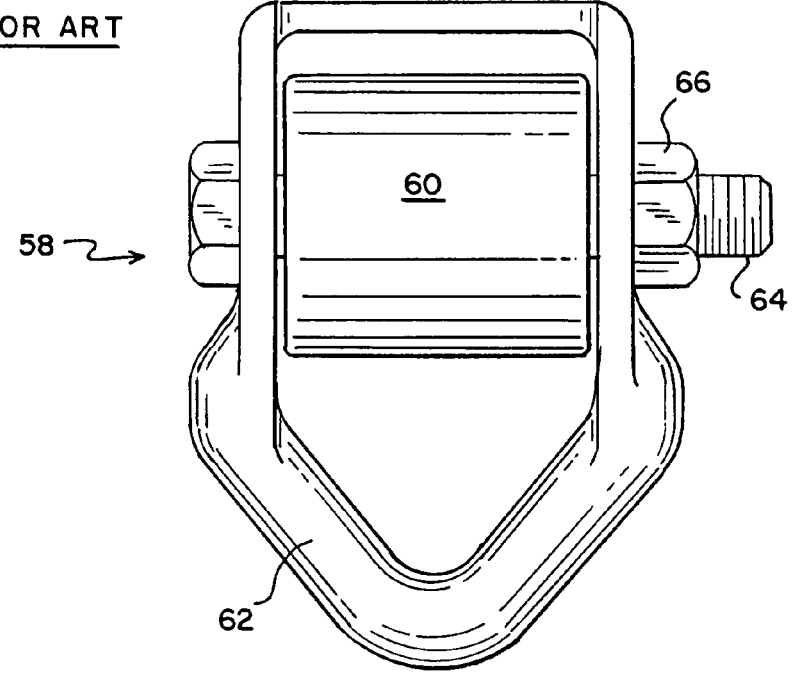
FIG. 6 is a front elevational view of a further prior art anchor assembly having an increased banding radius.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention and virtually any appropriate manner.

FIGS. 7-10 show an anchor assembly 68 having a retrofit adapter 70 according to the present invention. In the illustrated embodiment, the anchor assembly 68 includes the interlocking retainer 22 and link 26 of FIG. 1. The retrofit adapter 70 is welded onto the prior art link 26 to collectively form an improved link 72. Preferably, the two curved surfaces 74 of the adapter 70 are configured to cooperate with the bottom 52 of the banding surface 32 of the FIG. 1 link 26 to create a combined load bearing surface 76.

The improved link 72 functions to receive metal banding in the general sense of the prior art link 26 of FIG. 1. However, as perhaps best illustrated in FIG. 9, the combined load bearing surface 76 is larger than the banding surface 32 and allows for a greater banding radius "rr". Preferably, the banding radius "rr" is between approximately one-half inch and approximately one and one-half inches. In a preferred embodiment, this radius "rr" is on the order of about one inch. FIG. 9 shows that the combined load bearing surface 76 approximates a large, smooth arc, whereas the banding surface 32 illustrated in FIGS. 3 and 4 is more U-shaped and creates isolated zones 44 with small banding radii. Accordingly, due to the improved link 72, the tensile stress in the steel band 46 is spread over a greater surface area, there is a reduction in "creasing" along the radius "rr" when compared with along radii "r", and the occurrence of band breakage at heavier and/or relatively unstable loads is decreased. Furthermore, it is thought that, under typical transport conditions, an improved link according to the present invention significantly reduces or virtually eliminates band breakage by limiting metal fatigue which, in prior art anchor assemblies, causes the critical stress level of the metal banding to drop below the amount resulting from the applied tensile force.

Figure 12:
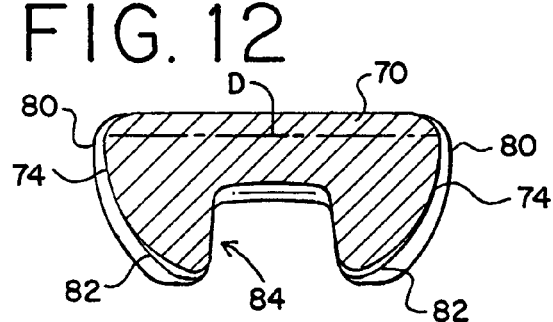
FIG. 12 is a cross-sectional view of the saddle portion of the retrofit adapter, along the line 12-12 of FIG. 11.
Figure 13:
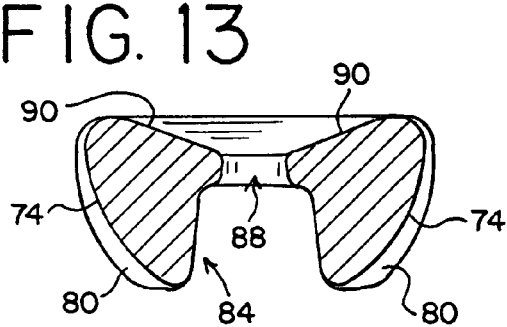
FIG. 13 is a cross-sectional view of the slot and welding slopes of the retrofit adapter, along the line 13-13 of FIG. 11.

In an alternate embodiment, the adapter 70 can include two guide flanges 80 which are shown disposed along the sides of its two curved surfaces 74. The flanges 80 extend beyond or flank the two curved surfaces 74, as best shown in FIGS. 12 and 13, and guide the metal band 46 when it is first applied to the improved link 72, by preventing it from moving laterally beyond the bounds of the combined load bearing surface 76.

As shown in FIG. 9, in the stored position, the guide flanges 80 can be useful in preventing the combined load bearing surface 76 from coming into contact with the floor surface 24 of the flatcar. Accordingly, the flanges 80 can assist in having the combined load bearing surface 76 remain cleaner than when flanges are omitted and allow a true fit for the metal band 46, when engaged. Also, unlike prior art links which will freeze to the railway car deck or frame under winter conditions, flanges 80 minimize the risk of such freezing, due largely to the minimal surface of the unit according to the invention that engages the deck or frame of the car.

Figure 11:
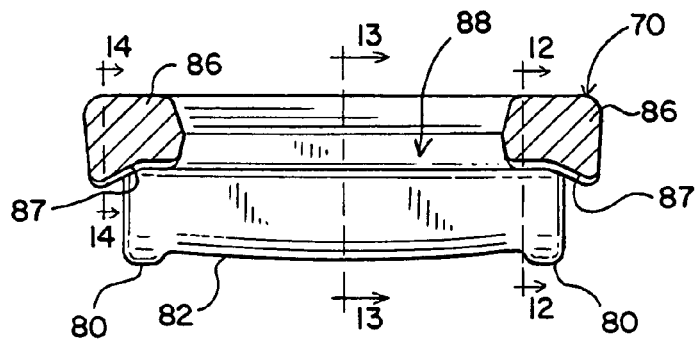
FIG. 11 is a cross-sectional view of the retrofit adapter, along the line 11-11 of FIG. 7, with the link omitted for clarity

The adapter 70 may include a lateral, convex curvature 82 along the two curved surfaces 74, in which event the curvature 82 will have a minimum radius "RR". Radius "RR" can be substantially constant throughout the transverse curvature of radius "rr". FIGS. 11 and 12 show such a curvature 82 at the bottom of the two curved surfaces 74. This curvature 82 may be configured to match the lateral curvature 38 of the banding surface 32 in FIGS. 1 and 2 in order to provide a smoother combined load bearing surface 76. The curvature 82 of the combined load bearing surface 76 preferably has a minimum radius of curvature "RR" of between approximately five and one-half inches and approximately fifteen inches along the two curved surfaces 74. A preferred minimum radius of curvature "RR" is on the order of about ten inches.

Alternatively, lateral radius "RR" can vary throughout some or all of the transverse curvature of radius "rr". In such a situation, the minimum lateral radius "RR" noted above will occur at only some locations, or perhaps only one location, along each curved surface 74. In a typical approach to providing a varying lateral curvature, the radii "RR" adjacent the saddle section 84 will exhibit such minimum radius, as shown in FIGS. 11 and 13. The lateral radius "RR" at other locations along the two curved surfaces 74 will be greater than the minimum radius.

As an illustration of a varying lateral radius "RR", at the locations where transverse diameter "D" intersects the two curved surfaces 74, such as shown in FIG. 12, the lateral radius "RR" is nominally infinite, with curvature 82 at this location approaching or reaching a straight line. In this illustration, there is a gradual reduction in the respective lateral radii "RR" values between the minimum lateral radius location or radii locations and the straight-line or approximate straight-line lateral radius or radii. Thus, the value of lateral radius "RR" at the intersections of "D" and surfaces 74 is greater than the value of the lateral radius "RR" adjacent the saddle section 84 and the value of the lateral radius "RR" is an intermediate value at all points along the two curved surfaces 74 therebetween.

As noted in FIG. 12, surfaces 74 extend beyond "D" in an upward direction as illustrated in FIG. 12. Considering this line "D" to be a 180° location, this extension therebeyond is to not more than about 250°, preferably to approximately 200°. In other words, each of the two curved surfaces extends beyond "D" through a distance corresponding to an arc or curve of about of 35° beyond "D". An extension greater or less than that shown in FIG. 12 and/or a non-symmetrical curve or arc also are contemplated by the present invention.

When a sufficient tensile force is applied to the steel band 46, it will beneficially deform to match the lateral curvature "RR" of the combined load bearing surface 76, which provides a "self-centering" function that prevents lateral shifting of the steel band 46 and helps secure the cargo. It will be seen that the radius of curvature of the transverse radius "RR" is preferably greater than the radius "R" of the prior art link, because an adequate "self-centering" function is achieved, with less deformation of the steel band 46.

Figure 14:
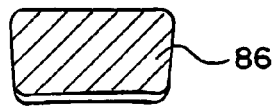
FIG. 14 is a cross-sectional view of a positioning tab of the retrofit adapter, along the line 14-14 of FIG. 11.

FIG. 12 shows that the adapter 70 includes a saddle section 84, with an inset which fits onto the link 26 of FIG. 1 and prevents misalignment before and during installation. The adapter 70 also provides positioning tabs 86, best shown in FIGS. 11 and 14, which prevent lateral shifting of the adapter 70 before and during installation. This centers the adapter on the link, preferably by engagement between the link and contoured surfaces 87 of the tabs 86. These features combine to provide both longitudinal and horizontal alignment and to maintain such alignment during assembly.

Once the adapter 70 has been placed onto the link 26 and aligned by the inset of saddle 84 and positioning tabs 86, when they are provided, the adapter is welded into place. FIG. 7 shows that the adapter 70 includes a slot 88 that allows access to the adapter-link interface. FIGS. 10 and 13 show two welding slopes 90 disposed at opposite sides of the slot 88, which ease the welding application.

In order to connect the adapter 70 to the link 26, a three-step welding procedure is preferred, as shown in FIG. 10. In a preferred first welding pass, the left side of the slot 88 is welded to the top of the link 26 by a first weld 92. In a second welding pass, a weld 94 is made to affix the right side of the slot 88 to the top of the link 26. Typically the first and second passes each provide a flat fillet weld. Finally, those two welds 92 and 94 are reinforced by an overlying third weld 96. Typically the third pass provides a convex fillet weld, as shown at 96, with two edges that are approximately flush with the top of slot 88. Preferably, the welding slopes 90 are configured such that the first two welding locations are easily accessible with the welding instrument.

Importantly, the improved link 72 is created without having to remove and replace the existing anchor assembly 20. While the illustrated adapter is applied to an anchor assembly according to FIG. 1, the present invention can be adapted to work with other existing anchor assemblies.

EXAMPLE

In a long-distance road test of about 1,000 miles along a commercial rail route, a link according to the present invention was compared to the prior art link of FIGS. 1-4 and the alternate retainer 22a which can be seen in FIG. 5. In the road test, three flatcars with thirty-six attachment points (i.e. eighteen steel bands) each were loaded with steel pipe according to Vibration Isolation Connection requirements of the American Association of Railroads (AAR).

The first flatcar used prior art links according to FIGS. 1-4, the second connected the steel bands directly to the alternate retainers 22a illustrated in FIG. 5, and the third flatcar used links according to the present invention. It was found that two of the eighteen steel bands used with each of the first two flatcars broke, whereas none of the steel bands used with the third flatcar broke during the entire length of this run.

It will be understood that the embodiments of the present invention which have been described are illustrative of some of the applications of the principles of the present invention.

Numerous modifications may be made by those skilled in the art without departing from the true spirit and scope of the invention, including those combinations of features that are individually disclosed or claimed herein.

The invention claimed is:

1. A lading tie anchor link adapter for a railway car, comprising:
   a body of the anchor link adapter having a combined load bearing banding surface for engaging a length of metal banding, said combined load bearing banding surface comprising two curved surfaces;
   a saddle section located between said two curved surfaces;
   said saddle section having a laterally extending inset configured for engagement with a link of an anchor assembly secured to a railway car; and
   said two curved surfaces extending in opposite directions that are generally transverse to said laterally extending inset, thereby defining a combined load bearing banding surface that is larger than the banding surface of the anchor assembly link.

2. The lading tie anchor link adapter of claim 1, further including a plurality of positioning tabs cooperating with said saddle section for engaging said link.

3. A lading tie anchor link adapter for a railway car, comprising:
   a body of the anchor link adapter having a combined load bearing banding surface for engaging a length of metal banding, said combined load bearing banding surface comprising two curved surfaces;
   a saddle section located between said two curved surfaces;
   said saddle section having a laterally extending inset configured for engagement with a link of an anchor assembly secured to a railway car; and
   said two curved surfaces extending in opposite directions that are generally transverse to said laterally extending inset, thereby defining a combined load bearing banding surface that is larger than the banding surface of the anchor assembly link, and further including a slot communicating with said saddle section for facilitating welding of the lading tie anchor link adapter to the anchor assembly link.

4. A lading tie anchor link adapter for a railway car, comprising:
   a body of the anchor link adapter having a combined load bearing banding surface for engaging a length of metal banding, said combined load bearing banding surface comprising two curved surfaces;
   a saddle section located between said two curved surfaces;
   said saddle section having a laterally extending inset configured for engagement with a link of an anchor assembly secured to a railway car; and
   said two curved surfaces extending in opposite directions that are generally transverse to said laterally extending inset, thereby defining a combined load bearing banding surface that is larger than the banding surface of the anchor assembly link, and further including a slot communicating with said saddle section for facilitating welding of the lading tie anchor link adapter to the anchor assembly link and two welding slopes disposed at different sides of said slot for allowing access to a welding location between the lading tie anchor link adapter and the anchor assembly link.

5. The lading tie anchor link adapter of claim 1, wherein said two curved surfaces and a bottom portion of the banding surface of the anchor assembly link collectively form said combined load bearing banding surface for engaging the metal banding.

6. The lading tie anchor link adapter of claim 1, wherein said combined load bearing banding surface has a banding radius in a range of between approximately one-half inch and approximately one and one-half inches.

7. The lading tie anchor link adapter of claim 6, wherein said combined load bearing surface has a banding radius that is approximately one inch.

8. The lading tie anchor link adapter of claim 1, wherein said two curved surfaces have substantially identical lateral, convex curvatures.

9. The lading tie anchor link adapter of claim 8, wherein said lateral, convex curvatures each have a constant radius of curvature along said two curved surfaces.

10. The lading tie anchor link adapter of claim 9, wherein said lateral, convex curvatures each have a radius of curvature in a range of between approximately five and one-half inches and approximately fifteen inches long.

11. The lading tie anchor link adapter of claim 9, wherein said lateral, convex curvatures each have a radius of curvature that is between approximately eight inches and approximately fourteen inches.

12. The lading tie anchor link adapter of claim 8, wherein said two curved surfaces each include a varying lateral, convex curvature having a minimum radius of curvature at one location along each curved surface and a maximum radius of curvature at another location along each curved surface.

13. The lading tie anchor link adapter of claim 12, wherein the minimum radius of curvature is between approximately five and one-half inches and approximately fifteen inches, and wherein the maximum radius of curvature generally equates to a straight line.

14. A lading tie anchor link adapter for a railway car, comprising:
   a body of the anchor link adapter having a combined load bearing banding surface for engaging a length of metal banding, said combined load bearing banding surface comprising two curved surfaces;
   a saddle section located between said two curved surfaces;
   said saddle section having a laterally extending inset configured for engagement with a link of an anchor assembly secured to a railway car; and
   said two curved surfaces extending in opposite directions that are generally transverse to said laterally extending inset, thereby defining a combined load bearing banding surface that is larger than the banding surface of the anchor assembly link, and further including a guide flange disposed at each opposite side of said two curved surfaces.

15. The lading tie anchor link adapter of claim 1, wherein said two body curved surfaces define a horizontal diameter therewithin, and said two body curved surfaces extend beyond the diameter in a direction opposite of said saddle such that each of said surfaces extends a distance corresponding to an arc of about 35° above said diameter.

16. A lading tie anchor assembly for a railway car, comprising:
   a retainer affixed to a floor or frame of a railway car;
   an anchor assembly link for interlocking engagement with said retainer, said anchor assembly link having a banding surface;
   a lading tie link adapter having a body with two curved surfaces;
   a laterally extending slot in said link adapter body, said slot including a first side and a second side and said two curved surfaces extending in opposite directions that are generally transverse to said slot; and said first side is affixed to the anchor assembly link by a first weld and said second side is affixed to the anchor assembly link by a second weld to provide a combined load bearing banding surface for engaging a length of metal banding, said combined load bearing banding surface comprising said two curved surfaces, said combined load bearing banding surface being larger than said anchor assembly link banding surface.

17. The lading tie anchor assembly of claim 16, further including a third weld covering said first weld and said second weld.

18. A method for retrofitting a lading tie anchor assembly for a railway car, comprising:
   providing a retainer affixed to a floor or frame of a flatcar;
   providing an anchor assembly link interlocked with the retainer affixed to the flatcar, said link having a banding surface for engaging a length of metal banding;
   mating the anchor assembly link to a lading tie link adapter having a curved surface which is larger than and extends beyond the banding surface of the anchor assembly link, the lading tie link adapter having a laterally extending slot with a top, a first side, and a second side, said curved surface extending in a direction that is generally transverse to the slot;
   welding the first side of said slot to said link with a first weld;
   welding the second side of said slot to said link with a second weld; and
   welding said first weld and said second weld together with a third weld.

19. The method of claim 18, wherein said first weld and second weld are flat fillet welds and said third weld is a convex fillet weld.

20. The method of claim 18, wherein edges of said third weld are approximately flush with the top of said slot.

21. A method for retrofitting a lading tie anchor assembly for a railway car, comprising:
   providing an anchor assembly link interlocked with a retainer that is affixed to a floor or frame of a flatcar, the link having a banding surface for engaging a length of metal banding;
   mating the anchor assembly link to a lading tie link adapter having a curved surface which is larger than and extends beyond the banding surface of the thus mated anchor assembly link, the lading tie link adapter having a laterally extending slot with a top, a first side, and a second side, said curved surface extending in a direction that is generally transverse to the slot; and
   securing the first side and the second side of the slot to the link to provide a combined load bearing banding surface that is larger than the link banding surface.

22. The method of claim 21, wherein said securing comprises welding the link to the first side and to the second side of the slot.

23. A lading tie anchor assembly for a railway car, comprising:
   a retainer affixed to a floor or frame of a railway car;
   an anchor assembly link for interlocking engagement with said retainer, said anchor assembly link having a banding surface, said anchor link adapter having a body;
   a combined load bearing banding surface for engaging a length of metal banding, said combined load bearing banding surface comprising two curved surfaces of said body;
   a saddle section located between said two curved surfaces;
   said saddle section having a laterally extending inset configured for engagement with a link of an anchor assembly secured to a railway car; and
   said two curved surfaces extending in opposite directions that are generally transverse to said laterally extending inset, thereby defining a combined load bearing banding surface that is larger than said banding surface of the anchor assembly link.

24. The lading tie anchor link adapter of claim 23, wherein said two curved surfaces and a bottom portion of the banding surface of the anchor assembly link collectively form said combined load bearing banding surface for engaging the metal banding.

* * * * *